United States Patent Office 3,153,099
Patented Oct. 13, 1964

3,153,099
PRODUCTION OF 1,4-DINITRO-2,3,5,6-
TETRAALKYLBENZENES
Charles J. Lind, Hamburg, and Casimir A. Warren, Tonawanda, N.Y., assignors to Allied Chemical Corporation, New York, N.Y., a corporation of New York
No Drawing. Filed Mar. 14, 1961, Ser. No. 95,516
7 Claims. (Cl. 260—645)

The present invention relates to an improved process for producing 1,4-dinitro-2,3,5,6-tetraalkylbenzenes in excellent yield and quality.

Dinitrotetraalkylbenzenes have been produced by nitration of the corresponding tetraalkylbenzenes, generally in the presence of organic solvents, with concentrated nitric acid, fuming nitric acid or mixed acids, i.e. mixtures of sulfuric and nitric acids. These processes, however, are subject to one or more of the following disadvantages which have militated against their commercial utilization:

(1) Products of poor quality and in low yield are obtained.
(2) Complex reaction mixtures from which separation of product of acceptable quality is difficult are formed.
(3) The processing conditions are difficult to control.
(4) Use of highly corrosive reactants and/or process effluents requires use of expensive operating equipment.
(5) Hazards to health and safety are encountered by use of organic solvents and noxious by-products.

An object of this invention is to provide a simple and economical process for production of 1,4-dinitro-2,3,5,6-tetraalkylbenzenes in excellent yield and quality.

Another object is to provide a simple and economical process for producing 1,4-dinitro-2,3,5,6-tetramethylbenzene, known generally as "dinitrodurene," in excellent yield and quality.

Other objects and advantages will be apparent from the following description and examples.

In accordance with the present invention, 1,4-dinitro-2,3,5,6-tetraalkylbenzenes are produced by forming a slurry of a 2,3,5,6-tetraalkylbenzene in concentrated aqueous sulfuric acid at temperature below about 15° C., reacting said slurry with a nitrating agent comprising nitric acid, in ratio of about 2.0 to 2.25 mols of nitric acid per mol of 2,3,5,6-tetraalkylbenzene, while maintaining said temperature below about 15° C., and recovering the 1,4-dinitro-2,3,5,6-tetraalkylbenzene from the resulting reaction mass. The 1,4-dinitro-2,3,5,6-tetraalkylbenzene product, which may be recovered by drowning, filtering, washing and drying, is of a quality which permits it to be used directly in most applications without the necessity of further purification.

The process of this invention possesses substantial advantages over the processes of the prior art, including the following:

(1) No organic solvent is required; hence, the cumbersome and often expensive procedures necessary to isolate the product from solvent are avoided.
(2) The reagents used in this process are very easily handled and present no unusual hazard to operating equipment or personnel.
(3) The reaction proceeds in an easily controllable manner and does not require use of complicated instrumentation to control the reaction.
(4) The reaction is productive of exceptionally high yields, in the order of about 90 to 95% of theory, and of high quality product.

In accordance with the preferred embodiment for carrying out the invention, a homogeneous slurry of a 2,3,5,6-tetraalkylbenzene in sulfuric acid of about 85 to 98% by weight strength is cooled to temperature between about 5° and 10° C. To this slurry, a mixed acid, in amount containing about 2.0 to 2.1 mols of nitric acid per mol of 2,3,5,6-tetraalkylbenzene, is added at such rate that the temperature of the reaction mixture is maintained at about 5° to 10° C. The reaction is strongly exothermic and efficient cooling is required especially at the commencement of the acid addition. The resulting reaction mass is drowned in cold water, filtered, washed with water and then dried.

The process of this invention can be used to produce 1,4-dinitro-2,3,5,6-tetraalkylbenzenes generally, and particularly those in which the alkyl radical contains from 1 to 5 carbon atoms.

It is essential to use concentrated aqueous sulfuric acid as the suspending medium for the 2,3,5,6-tetraalkylbenzene, and preferably sulfuric acid of about 85 to 98% by weight strength is employed. Use of sulfuric acid of higher concentration has resulted in the obtainment of product of poor quality and in low yield. On the other hand, use of sulfuric acid of lower concentration tends to result in such a slow reaction as to be uneconomical. Preferably the 2,3,5,6-tetraalkylbenzene is dispersed in about 7 to 15 times or more its weight of concentrated aqueous sulfuric acid.

The slurry of 2,3,5,6-tetraalkylbenzene in concentrated aqueous sulfuric acid is preferably agitated for a sufficient period, such as about 15 to 30 minutes, in order to obtain a homogeneous dispersion of the 2,3,5,6-tetraalkylbenzene in the sulfuric acid. This "conditioning" step can be assisted by grinding the 2,3,5,6-tetraalkylbenzene, e.g. to about 20 to 40 mesh, prior to use. Use of the finely divided 2,3,5,6-tetraalkylbenzene enables the obtainment of substantially complete reaction.

Although nitric acid per se can be used as the nitrating agent, better control of the reaction is attained through use of a mixed acid (comprising nitric acid, sulfuric acid and usually water). The mixed acid generally contains about 29 to 45.5% by weight of nitric acid, about 54.5 to 65% by weight of sulfuric acid and 0 to about 14% by weight of water. The amount of nitric acid employed is in the ratio of about 2.0 to 2.25 mols, and preferably about 2.0 to 2.1 mols, per mol of 2,3,5,6-tetraalkylbenzene. Use of larger amounts of nitric acid are not desirable inasmuch as the tendency of the reaction mixture to foam increases as the amount of excess nitric acid present increases. Such foaming is not only objectionable from a processing point of view but is also indicative of poor quality and low yields of product. Use of smaller amounts of nitric acid results in the obtainment of unacceptably low product yields.

Temperature below about 15° C. is maintained during dispersion of the 2,3,5,6-tetraalkylbenzene in concentrated aqueous sulfuric acid and during the subsequent nitration reaction. Particularly outstanding results have been obtained when these temperatures are maintained at about 5° to 10° C.

The reaction vessel used in carrying out the process of this invention is of conventional design and may be fabricated of acid-resistant material such as enameled steel. An efficient means of cooling should be provided, as, for example, a cooling jacket or immersed coil. An efficient agitator, temperature recorder and other appurtenances common to this type of equipment should also be provided, as will be obvious to those skilled in the art.

The following examples, in which parts are by weight, illustrate the present invention:

*Example 1*

To 1100 parts of sulfuric acid of about 93.2% by weight strength, cooled to a temperature of 5° to 10° C. in a reaction vessel, 100 parts of powdered (passed through a 40 mesh screen) 2,3,5,6-tetramethylbenzene were added. The mixture was agitated at temperature of 5° to 10° C. for about 15 minutes to obtain a homogeneous slurry of 2,3,5,6-tetramethylbenzene in sulfuric acid. Thereafter 331 parts of a mixed acid (comprising 29% by weight of nitric acid, 57% by weight of sulfuric acid and 14% by weight of water) were added dropwise to the reaction mixture over a period of about 2½ hours, while maintaining the temperature of the reaction mixture at 5° to 10° C. The slurry originally a light tan color turned a deep chocolate color after addition of the first few drops of the mixed acid, and the final addition of the mixed acid caused an appreciable lightening of the color of the slurry.

The agitation of the reaction mixture was continued for ½ hour after the final addition of the mixed acid, and the reaction mass was then drowned in a mixture of 2500 parts of ice and 2000 parts of water, the temperature being maintained at 15° to 20° C. The reaction vessel was rinsed with 2000 parts of water, adding the rinsings to the drowned mixture. The resulting slurry was agitated for 15 minutes and then filtered. The filter cake was washed with 6000 parts of water, and the washed cake was dried at 60° to 70° C. in a circulating air dryer. 155.5 parts of high quality 1,4-dinitro-2,3,5,6-tetramethylbenzene (melting point 205° to 210° C.), representing a yield of about 93% of theory, were obtained.

*Example 2*

The process of Example 1 was repeated using a mixed acid comprising 29% by weight of nitric acid, 65% by weight of sulfuric acid and 6% by weight of water. The results obtained with respect to both yield and quality of the 1,4-dinitro-2,3,5,6-tetramethylbenzene product were substantially the same as those obtained in Example 1.

*Example 3*

When the process of Example 1 is repeated using an equivalent quantity of 2,3,5,6-tetra-n-propylbenzene in place of 2,3,5,6-tetramethylbenzene, the product 1,4-dinitro-2,3,5,6-tetra-n-propylbenzene is obtained in excellent yield and quality.

*Example 4*

When the process of Example 1 is repeated using an equivalent quantity of 2,3,5,6-tetraethylbenzene instead of 2,3,5,6-tetramethylbenzene, the product 1,4-dinitro-2,3,5,6-tetraethylbenzene is obtained in excellent yield and quality.

The 1,4-dinitro-2,3,5,6-tetraalkylbenzenes of this invention are particularly useful as intermediates for the production by reduction of 1,4-diamino-2,3,5,6-tetraalkylbenzenes.

It is to be understood that the above details, although including the preferred embodiments of our invention, are given for the purpose of illustration and that, as will be obvious to those skilled in the art, considerable variation in the illustrative details can be made without departing from the scope and spirit of the invention.

We claim:

1. The process of producing 1,4-dinitro-2,3,5,6-tetraalkylbenzenes which comprises forming a slurry of a 2,3,5,6-tetraalkylbenzene in concentrated aqueous sulfuric acid at temperature below about 15° C., reacting said slurry in the absence of an organic solvent with a nitrating agent comprising nitric acid, in ratio of about 2.0 to 2.25 mols of nitric acid per mol of 2,3,5,6-tetraalkylbenzene, while maintaining said temperature below about 15° C., and recovering the 1,4-dinitro-2,3,5,6-tetraalkylbenzene from the resulting reaction mass.

2. The process of claim 1 wherein the concentrated aqueous sulfuric acid comprises sulfuric acid of about 85 to 98% by weight strength.

3. The process of claim 1 wherein the nitrating agent is a mixed acid.

4. The process of claim 1 wherein the nitric acid is employed in ratio of about 2.0 to 2.1 mols of nitric acid per mol of 2,3,5,6-tetraalkylbenzene.

5. The process of claim 1 wherein the temperature is maintained at about 5° to 10° C.

6. The process of producing 1,4-dinitro-2,3,5,6-tetraalkylbenzenes which comprises forming a homogeneous slurry of a 2,3,5,6-tetraalkylbenzene in sulfuric acid of about 85 to 98% by weight strength at temperature of about 5° to 10° C., reacting said slurry in the absence of an organic solvent with a mixed acid, in amount containing about 2.0 to 2.1 mols of nitric acid per mol of 2,3,5,6-tetraalkylbenzene, while maintaining said temperature at about 5° to 10° C., and recovering the 1,4-dinitro-2,3,5,6-tetraalkylbenzene from the resulting reaction mass.

7. The process of claim 6 wherein the 2,3,5,6-tetraalkylbenzene is 2,3,5,6-tetramethylbenzene.

References Cited in the file of this patent

UNITED STATES PATENTS 2,581,972    Rottschaefer    Jan. 8, 1952
2,864,871    Morningstar    Dec. 16, 1958

OTHER REFERENCES

Illuminati et al.: J. Am. Chem. Soc., vol. 75, pp. 2159–2161 (1953).